Figure 4:
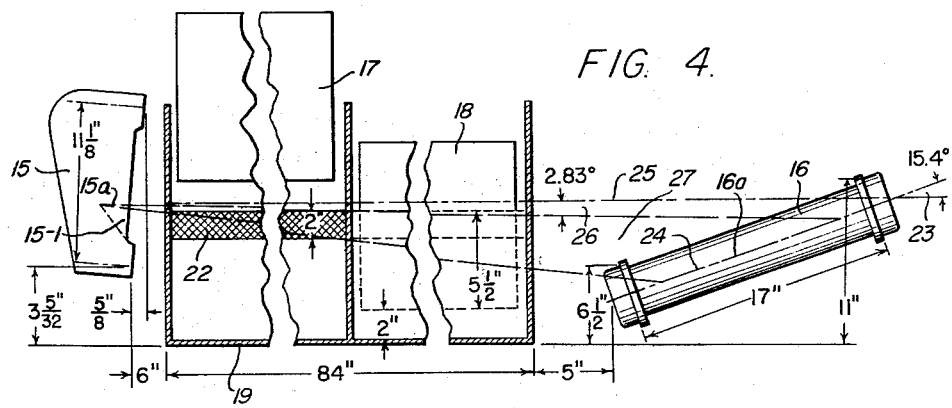

April 26, 1966  H. W. FRANZ  3,248,061
METHOD AND APPARATUS UTILIZING RADIATION FOR DEPTH CONTROL
OF FLOWABLE MATERIALS
Filed Nov. 8, 1961  4 Sheets-Sheet 1
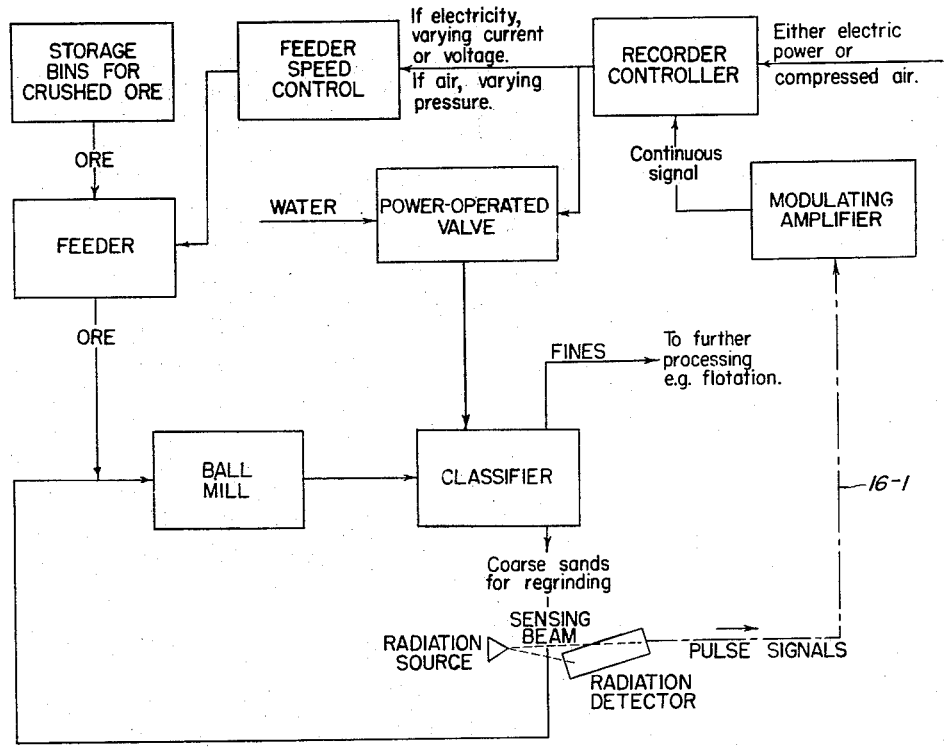
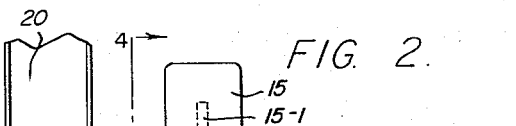
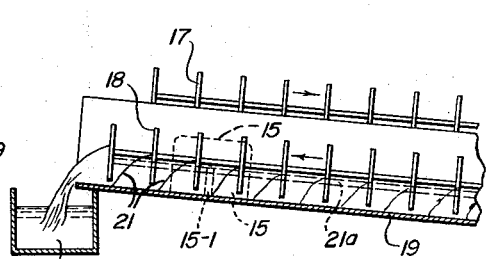
INVENTOR.
HENRY W. FRANZ
BY
ATTORNEYS April 26, 1966 H. W. FRANZ 3,248,061
METHOD AND APPARATUS UTILIZING RADIATION FOR DEPTH CONTROL
OF FLOWABLE MATERIALS
Filed Nov. 8, 1961 4 Sheets-Sheet 2

SIGNAL OUTPUT V.S. SAND HEIGHT

INVENTOR.
HENRY W. FRANZ

BY

ATTORNEYS

April 26, 1966 H. W. FRANZ 3,248,061
METHOD AND APPARATUS UTILIZING RADIATION FOR DEPTH CONTROL
OF FLOWABLE MATERIALS
Filed Nov. 8, 1961 4 Sheets-Sheet 3

*INVENTOR.*
HENRY W. FRANZ

BY *Mallinckrodt and Mallinckrodt*
ATTORNEYS

April 26, 1966   H. W. FRANZ   3,248,061
METHOD AND APPARATUS UTILIZING RADIATION FOR DEPTH CONTROL
OF FLOWABLE MATERIALS
Filed Nov. 8, 1961   4 Sheets-Sheet 4
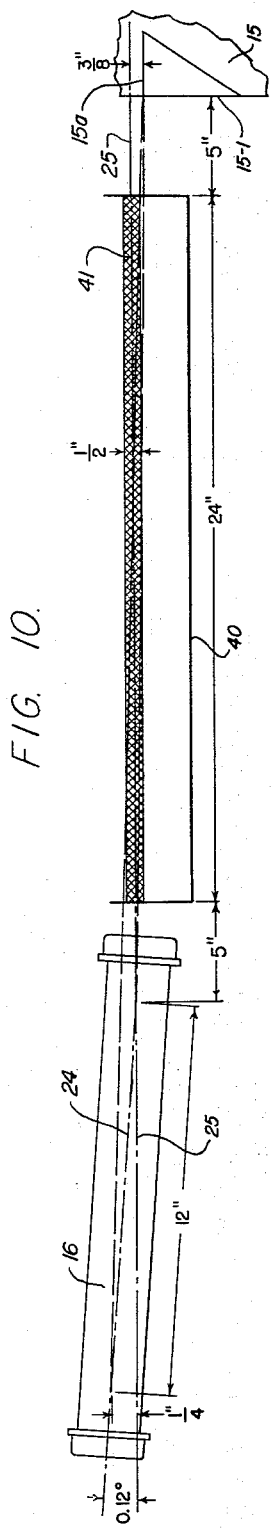
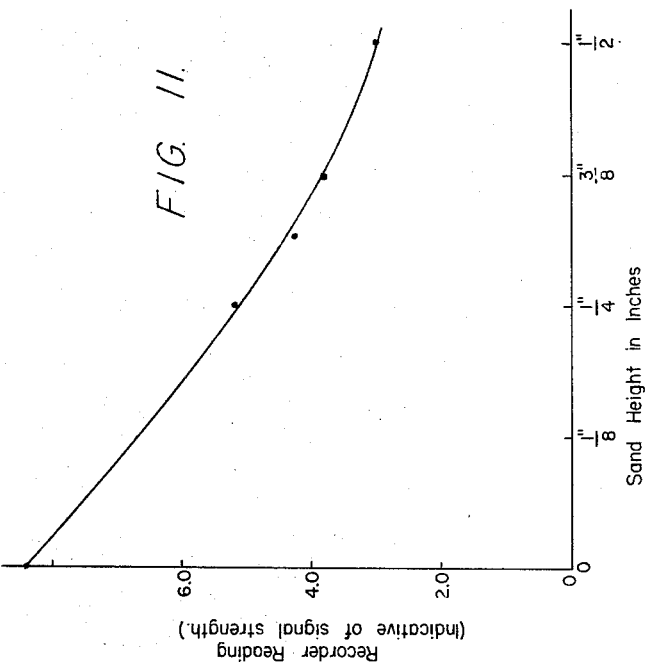
INVENTOR.
HENRY W. FRANZ
BY Mallinckrodt and
Mallinckrodt
ATTORNEYS

United States Patent Office 3,248,061
Patented Apr. 26, 1966

3,248,061
METHOD AND APPARATUS UTILIZING RADIATION FOR DEPTH CONTROL OF FLOWABLE MATERIALS
Henry W. Franz, Salt Lake City, Utah, assignor to Kennecott Copper Corporation, New York, N.Y., a corporation of New York
Filed Nov. 8, 1961, Ser. No. 151,077
14 Claims. (Cl. 241—30)

This invention relates to the automatic control of industrial processes in accordance with detected variations in penetrating radiation applied for control purposes to material being processed, and is particularly concerned with automatically controlling one or more operations of an industrial process on the basis of minor variations in depth of material being processed.

In the processes with which I am especially concerned, the material is handled as a flowing stream. However, the invention is also applicable to processes where the material is handled as a confined body, so long as only minor variations in depth, i.e. a few inches, are involved.

Gamma rays from radioactive sources, such as radioactive isotopes, are being extensively used in industry for control purposes. Yet, their application has been limited by the requirement in many processes that the control exercised be directly proportional to the extent of variations occurring in the material being processed and by the fact that such control is not easily attained in all instances. One of these instances is where control is desired on the basis of variations in depth of streams or bodies of flowable material being processed, especially semi-liquid pulps and slurries such as are commonly dealt with in metallurgical milling circuits.

In the making of the invention a principal object was to obtain, in such an instance, a control signal responding linearly to variations in depth of the material, so that the extent of control in any given instance will be directly proportional to the change in depth of the body of material.

In known uses of gamma rays for process control purposes, a radiation detector, such as a Geiger-Muller counter, scintillator, or the like, and a source of radiation are arranged at opposite sides of the control material so the radiation will pass from the source to the detector through the material, the detector tube being placed at right angles to the main line of radiation. Signals so obtained are due to radiation not absorbed by the material, and are exponential in magnitude relative to variations in density or position of the material.

Such signals are useful only in the exercise of simple on and off control. However, with respect to density, signal linearity has been achieved by electronically altering signal characteristics. This enables considerably more sophisticated process control, but requires complicated and expensive electronic equipment. While it is conceivable that satisfactory alteration of signal characteristics could be achieved similarly with respect to variations in position, e.g. quantity, of the control material, the present invention provides for signal linearity in a far simpler manner without the special electronic equipment mentioned above.

In accordance with the invention, the radiation is passed transversely through the variable-depth stream or other body of flowable material, from one lateral side thereof, so that somewhere along the width of such body the total depth of the zone of height fluctuation is traversed by radiation. The radiation that so traverses the zone of height fluctuation and is not absorbed by the material may be appropriately regarded as a sensing beam for control purposes.

It is a feature of the invention that the radiation detector be so inclined and placed at the opposite lateral side of the body of material that its effective length will subtend and intercept the sensing beam. Accordingly, only that radiation which makes up the sensing beam will be detected and the detecting area for such radiation will be a maximum.

It has been found that this goes a long way toward establishing linearity of detected signals, so that they can be satisfactorily used to control the actuation of data-recording and process-control devices.

For shallow zones of height fluctuation, e.g. an inch or less, this setting of the detector, alone, gives as close an approach to true linearity of signal as is apparently possible to obtain, an approach which is quite satisfactory for most purposes.

For deeper zones of height fluctuation, e.g. an inch or more up to about the effective length of the detector, it is also necessary to set the radiation source with its principal radiation-directing guide inclined at a slight angle to the horizontal.

The exact positions and the exact angles of inclination of the detector and the radiation source relative to the zone of height fluctuation must be determined by experiment in any given instance, although, once determined, they remain constant for continuing use of such installation.

This invention is especially useful in its application to metallurgical milling circuits, which involve several items of processing equipment arranged to successively receive, process, and discharge a continuously flowing stream of metallurgical pulp or slurry. For example, a typical circuit for grinding and classifying ore prior to flotation includes a feeder for transferring ore at a controlled rate from an ore bin to a ball mill, where it is finely ground, usually in the presence of water. The discharge from the ball mill passes to a classifier, where all particles below a predetermined size range are separated from the relatively coarse sands and are discharged as a pulp or slurry for further processing, the coarse sands being recirculated to the ball mill as a slurry for regrinding.

In such a circuit, it is desirable to control new feed of ore to the ball mill and water to the classifier in accordance with variations in height of the sands being discharged from the classifier for recirculation, since the amount of the circulating sand load provides a reliable index of the grinding characteristics of the ore and of the associated ball mill load.

In accordance with the invention, the signals obtained from radiation applied to the stream of sand slurry discharged from the classifier in such a metallurgical processing circuit are used to automatically control the operation.

The invention may be applied in similar manner to automatically control the crest heights of flow of material over weirs and to regulate feed of material to one or more processing operations in a wide variety of material handling or treating plants.

One of the advantages of the invention is that the control apparatus utilized can be readily integrated with existing equipment, without the necessity of making extensive changes in such equipment.

There are shown in the accompanying drawings specific embodiments of the invention representing what are presently regarded as the best modes of carrying it out in practice. From the detailed description of these, other more specific objects and features of the invention will become apparent.

Figure 6:
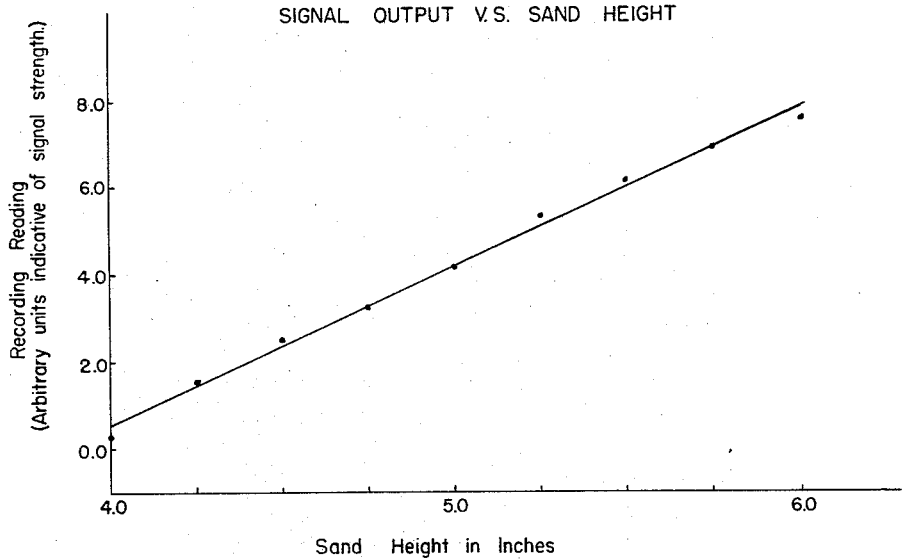
Figure 5:
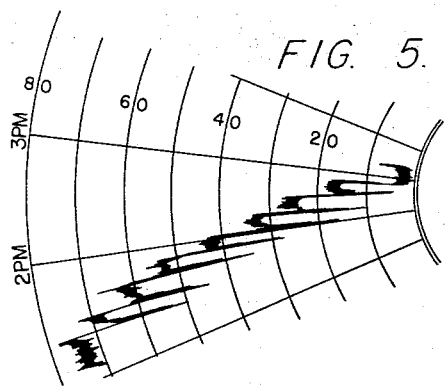
Figure 7:
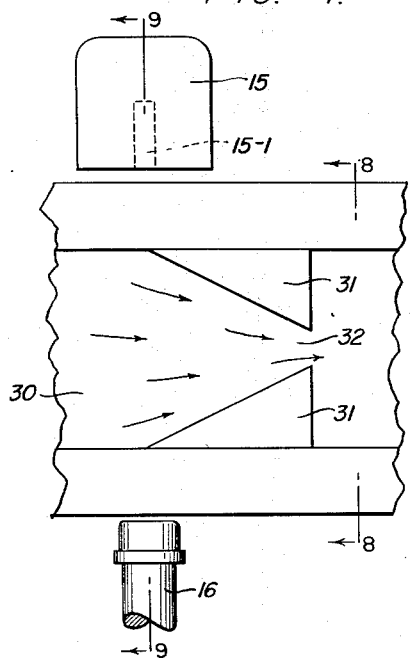
Figure 8:
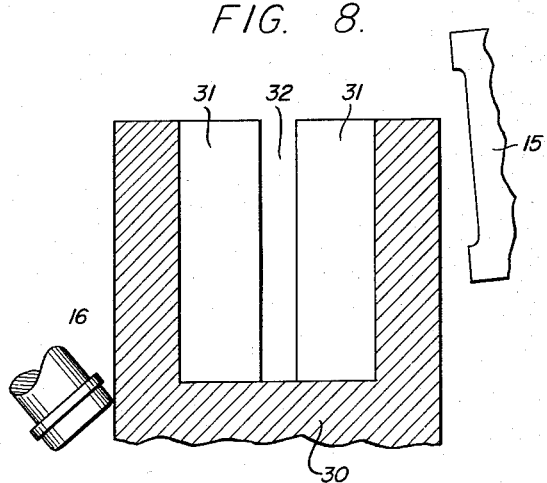
Figure 9:
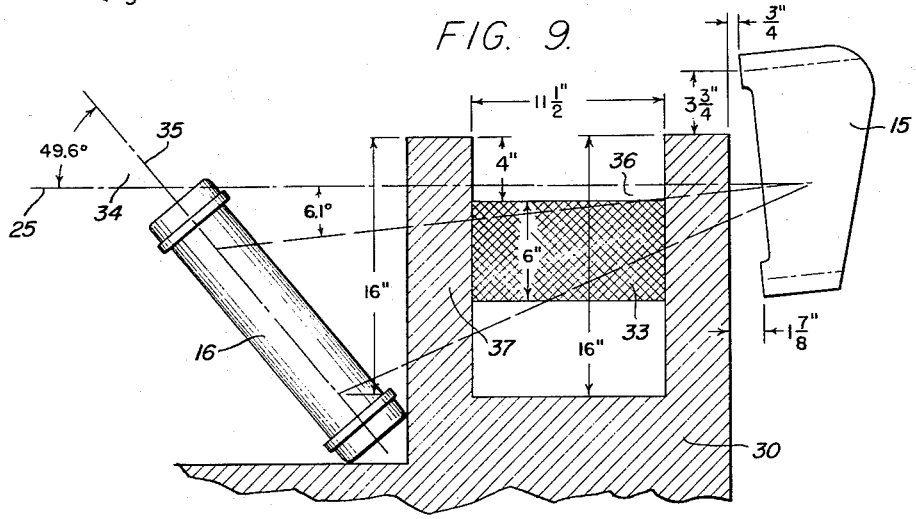

In the drawings:

FIG. 1 is a flow sheet representing a metallurgical grinding circuit to which the invention is applied for controlling both feed of ore to the ball mill and feed of water to the classifier in accordance with variations in volume of the recirculated sands, the zone of height fluctuation of the stream of sands being in the range of several inches;

FIG. 2, a fragmentary, schematic view in top plan of a rake classifier such as might be used with the milling circuit of FIG. 1, showing how the radiation source and detector are positioned;

FIG. 3, a vertical section taken on the line 3—3 of FIG. 2 and indicating, in full lines, how the sands build up in front of the rake blades on the upstroke of the rakes, and, in broken lines, how they level out on the downstroke of the rakes, the radiation emitter being shown by dotted lines;

FIG. 4, a radiation diagram taken on the line 4—4 of FIG. 2;

FIG. 5, the chart made by an electrical recording instrument in response to signals from the detector of the foregoing figures when the sand height was arbitrarily changed in ¼″ steps over a range of two inches;

FIG. 6, a graph plotted between sand height in inches and recorder readings taken from the chart of FIG. 5 to show linearity of the signals;

FIG. 7, a view corresponding to that of FIG. 2, but showing the apparatus applied to a recirculation launder between a cyclone type of classifier and the ball mill wherein the stream depth is purposely increased in order to accentuate variations in stream depth;

FIG. 8, a vertical section taken on the line 8—8 of FIG. 7;

FIG. 9, a radiation diagram taken on the line 9—9 of FIG. 7;

FIG. 10, a radiation diagram taken with respect to an installation where the depth of the zone of height fluctuation is only a fraction of an inch; and FIG. 11, a graph similar to that of FIG. 6 but made with respect to recorder readings for arbitrary changes in sand height in ⅛″ steps over a range of ½″.

Referring to the drawings:

A conventional ore grinding and classifying circuit is indicated in the flow sheet of FIG. 1 as including a ball mill, into which crushed ore is fed from storage bins by means of a suitable mechanical feeder, and a classifier receiving the ground ore discharged from the ball mill. The classifier, which may be of any suitable type, usually rake, cyclone, or spiral, separates the fines from coarse sands that must be recirculated to the ball mill for regrinding. Water requirements of the classifier are supplied from any suitable source under the control of a power-operated valve, as indicated.

In accordance with the invention, both the ore feeder and the valve governing the supply of water to the classifier are automatically controlled on the basis of the rise and fall from time to time of the stream of coarse sands passing from the classifier back to the ball mill, it being realized that the greater the quantity of sands recirculated, the less new feed that can be handled and vice versa. Fluctuations in the height, i.e. depth, of the stream of sands being recirculated to the ball mill are measured by the detection of penetrating radiation passed through the zone of height fluctuation from a suitable source, shown at 15 in FIGS. 2–4, 7 and 9 as being a conventional, protectively housed, encapsulated radioisotope from which the emitted radiation is directed through a passage 15–1 whose defining surfaces serve as guides in the projection of the radiation as a beam. The upper defining surface or radiation-directing guide 15a, FIG. 4, of such passage 15–1 establishes what might be appropriately termed for present purposes "the primary horizontal trace" of the beam. It should be realized that, after leaving passage 15–1, the radiation fans out on all sides and is not subject to exact delineation.

The radiation detector is shown in FIGS. 2–4, 7 and 9 as a conventional, elongate and protectively housed Geiger-Muller counter tube 16 having an electrical cable 16–1, FIG. 1, extending to connection with the signal amplifier. The effective length of the detector is established by the length of the tube proper within its protective housing, being here indicated 16a, FIG. 4. Such length in all commercially available detectors known to applicant is twelve inches.

The electrical output from the amplifier is used to control a suitable servomechanism for varying the supply of whatever agency, electricity, compressed air, etc., is utilized to operate the ore feeder and valve. It is preferred to use a standard recorder controller—preferably a recording potentiometer—as the servomechanism, so that a control record is obtained.

As previously indicated, it is the way in which the radiation source and/or detector are placed relative to the zone of height fluctuation of the body of material that determines whether the required linearity of signal for control purposes is obtained. The most convenient reference for specifying angular placement of the detector is the longitudinal axis thereof considered with respect to the horizontal, while the most convenient reference for specifying angular placement of the radiation source is the upper radiation-directing guide for the projected radiation, also considered with respect to the horizontal. However, before these angular positions can be determined, it is necessary that a roughly proper placement of radiation source and detector be made with respect to the zone of height fluctuation.

For a relatively deep zone of height fluctuation, the radiation source is advantageously placed with its upper radiation-directing guide about coincident with the upper boundary of the zone, but, for a relatively shallow zone, it has been found preferable to place the radiation source below the lower boundary of the zone, so the primary horizontal trace of the projected beam will pass through the zone as it fans out after leaving the source. So far as the detector is concerned, in all instances the objective is to place it such that its effective length will subtend the sensing beam. In this connection, it should be noted that the boundaries of the sensing beam are tangible only in terms of the results obtained and can be visualized only after tests are made for linearity of signal. Yet, a rough estimate of its location can be made from the depth and width of the zone of height fluctuation and from the initial positioning of the radiation source, the detector being positioned initially in accordance with this estimate. In general, the initial positioning of the detector will not be too far off if the midpoint of its effective length is aligned with the principal radiation-directing guide of the radiation source and its angle of inclination with respect to the horizontal is somewhere between one and forty-five degrees, depending upon the circumstances.

In FIGS. 2 and 3, the classifier is of standard reciprocating rake type having two rakes 17 and 18 arranged to operate in alternate up and down strokes, respectively, over an inclined, divided deck 19, so as to push oversize sands of a metallurgical slurry containing about 65% solids upwardly along such deck to discharge over the upper end of the deck into recirculation launder 20, which returns them to the ball mill for regrinding.

The rakes are lowered into the sands for the upstroke, see FIG. 3, and are raised above the level thereof for the downstroke, all in conventional manner, the sands piling up against the individual blades of the rakes during the upstroke, as indicated in full lines 21, and leveling out during the downstroke, as indicated by the broken line 21a.

In this application of the invention, the zone of height fluctuation 22, FIG. 4, of the sands being pushed upwardly of deck 19 by the rakes 17 and 18 is established when the rakes are lifted on the downstroke. As indicated, the depth of such zone is relatively great, i.e. about two inches, so, in accordance with the invention, both the detector 16 and the radiation source 15 are inclined relative to the horizontal. In the particular installation depicted, wherein the inclinations of both source and detector are downwardly toward each other and the pertinent dimensions and relative positions are as indicated in FIG. 4, linearity of signal was achieved when the acute angle 23 made by the longitudinal axis 24 of detector 16 with the horizontal 25 was 15.4° and when the acute angle 26 made by the upper, radiation-directing guide 15a with the horizontal 25 was 2.83°. The fact that linearity of signal was achieved indicates that the sensing beam was approximately as delineated at 27, which can be seen to include substantially all the radiation that traverses the full depth of the zone of height fluctuation 22 and which impinges upon substantially the entire effective length 16a of the detector.

The signals obtained in such an application of the invention have proven to be representative of the average height of the sands, even though the rakes work alternately and the rake blades sweep through the radiation. The usual modifying and amplifying components of the radiation detector system yield a continuous and representative signal for control purposes. Such a system, which includes detector and modulating amplifier, is commercially available from Industrial Nucleonics Corporation under the trademark "AccuRay" and need not be described here in further detail.

In FIG. 5 is shown a portion of an actual chart produced by the recorder controller during simulated operation of the rake classifier system of FIGS. 2-4, wherein a two-inch variation in sand height was arbitrarily effected in one-quarter-inch steps. It is apparent that the responses of the control signal to changes in sand height were remarkably close to being linear. The linearity of signal is further indicated by the graph of FIG. 6, wherein the recorder readings were plotted against the sand height in inches.

In the installation of FIGS. 7 and 8, the classifier is not shown, but coarse sands are discharged therefrom into a launder 30 for return to the ball mill. Here, the launder is the only convenient place for taking control measurements, although it is not normally a favorable place because the stream of sands is relatively shallow due to the nature of the launder. Accordingly, in order to obtain relatively large variations in height of the discharged sands flowing through the launder, considering the fact that the flow rate is high, i.e., about 50 tons per hour, means are provided for narrowing he flow channel. As illustrated, such means take the form of oppositely disposed, converging baffles 31 positioned across the interior of such launder, downstream from radiation source 15 and detector 16 to gradually narrow the flow channel down to a restricted opening 32. This increases the upstream depth of the zone of height fluctuation 33, FIG. 9, and accentuates the control criteria to an extent more or less commensurate with that of the rake classifier previously described.

Such an accentuation is highly desirable where significant reductions or increases in the quantity of material flowing would not normally change the depth of the zone of height variation appreciably. Moreover, the baffles 31 smooth out turbulence within the control zone, as well as minor flow fluctuations inherent in the system.

The radiation diagram superimposed on the vertical section shown in FIG. 9 and the pertinent dimensions appended indicate the conditions in the particular installation involved. Linearity of signal was achieved when the acute angle 34 made by the longitudinal axis 35 of detector 16 with the horizontal 25 was 49.6° and when the acute angle 36 made by the upper radiation-directing guide 15a of radiation source 15 with the horizontal 25 was 6.1°. Indications are that the sensing beam was as delineated at 37.

The installation of FIGS. 7 and 8 could apply to a classifier of cyclone or spiral type as well as to a rake classifier of so great a width that, if the apparatus was set up as in FIG. 2, a dangerously strong source of radiation would have to be used to effectively traverse the multiplicity of rake compartments involved. Where the installation of FIGS. 7 and 8 is applied to such a rake classifier, launder 30 would serve to receive the recirculation sands discharged from all rake compartments.

In instances where it is not practical to use stream-deepening baffles, particularly where the throughput is relatively minor, e.g., less than one ton per hour, the stream is subjected to height fluctuation sensing and measurement for control purposes in essentially the same manner as previously described, but just the detector is set at an angle. As previously indicated, however, the radiation source is positioned with its radiation-directing guide below the relatively shallow zone of height fluctuation.

Thus, as schematically illustrated in FIG. 10, in the case of a launder 40, having a flow passage two feet in width and carrying a stream flowing at the rate of about 1200 pounds per hour and whose height fluctuates within a zone 41 one-half an inch in depth, it has been found that a satisfactory approach to true linearity of signal is achieved, see FIG. 11, when the radiation source 15 is positioned with its upper, radiation-directing, guide surface 15a horizontal and below the zone of height fluctuation 41 by one-eighth of an inch so that the radiation fans out upwardly through such zone 41 from its primary horizontal trace, the detector 16 being placed with the lower end of its effective length 15a at the midpoint of the depth of the zone of height fluctuation 41 and inclined downwardly toward the stream so that its longitudinal axis 24 makes an angle of 0.12° with the horizontal 25.

As previously indicated, it is necessary in all instances that rough placement of both radiation source and detector be initially made on the basis of a reasonable estimate of where the boundaries of the sensing beam should be, followed by testing for linearity of signal and by progressively fine adjustments in relative positions of such radiation source and detector until the desired degree of linearity of signal is achieved.

While the radiation detector is shown in all instances as being inclined downwardly toward the body of material and the source, it should be realized that even though this is usually the most convenient orientation for achieving the objectives sought, it could be inclined outwardly therefrom. Likewise, the inclination of the principal radiation-directing guide of the radiation source could be outwardly instead of inwardly, depending upon position and orientation of both source and detector.

Whereas there are here illustrated and described apparatus and procedures which I presently regard as the best modes of carrying out my invention, it should be understood that various changes may be made without departing from the inventive concepts particularly pointed out and distinctly claimed herebelow.

I claim:

1. Apparatus for automatically controlling an industrial process operating on flowable material, the control being exercised on the basis of fluctuations in height of said material within a structure related to said process, comprising a source of penetrating radiation disposed at one lateral side of said structure to direct radiation transversely through said material so that somewhere along the width thereof the total depth of the zone of height fluctuation is traversed by radiation which serves as a sensing beam;

an elongate radiation detector disposed at an opposite lateral side of said structure with its longitudinal axis inclined at an acute angle relative to the horizontal, so that its effective length substantially subtends said sensing beam;

modulating and amplifying means for electrical signals put out by the detector in response to sensing beam radiation;

electrical servomechanism responsive to the output of the modulating and amplifying means; and means for controlling the feed of material to the process, said means being arranged for actuation by said servomechanism.

2. The apparatus of claim 1, wherein the radiation source has a principal radiation-directing guide; the zone of height fluctuation is relatively deep; and the radiation source is positioned with its said guide slightly inclined relative to the horizontal.

3. The apparatus of claim 1, wherein the radiation source has a principal radiation-directing guide; the zone of height fluctuation is relatively shallow; and the radiation source is positioned with its said guide horizontal.

4. In a processing system for operating on flowable material subject to variations in depth from time to time, the combination of structure defining a flow channel; a source of penetrating radiation disposed at one lateral side of said structure to direct radiation transversely through said material so that somewhere along the width thereof the total depth of the zone of height fluctuation is traversed by radiation which serves as a sensing beam; an elongate radiation detector disposed at an opposite lateral side of said structure with its longitudinal axis inclined at an acute angle relative to the horizontal, so that its effective length substantially subtends said sensing beam; means locally narrowing the flow channel immediately downstream from said radiation source and detector; and means responsive to varying electrical signals put out by the detector in response to sensing beam radiation.

5. The combination set forth in claim 4, wherein the structure is a trough-like channel; and the channel-narrowing means comprise downstream-convergent baffles within said channel serving as an incomplete dam.

6. In a metallurgical milling circuit which includes an ore-grinding mill, means for feeding ore to said mill, a classifier arranged to receive the ground ore discharged by the mill, and means for recirculating oversize ore from the classifier to the grinding mill, the combination of a source of penetrating radiation disposed at one lateral side of the stream of oversize ore to direct radiation transversely therethrough, so that somewhere along the width of said stream the total depth of the zone of height fluctuation is traversed by radiation which serves as a sensing beam; an elongate radiation detector disposed at an opposite lateral side of said stream with its longitudinal axis inclined at an acute angle relative to the horizontal, so that its effective length substantially subtends said sensing beam; modulating and amplifying means for electrical signals put out by the detector in response to sensing beam radiation; electrical servomechanism responsive to the output of the modulating and amplifying means; and means, arranged for actuation by said servomechanism, for controlling the ore feeding means.

7. The combination set forth in claim 6, wherein the classifier is of rake type, and the radiation source and detector are disposed at respectively opposite sides of the stream of oversize sands being pushed upwardly through the classifier by the rakes thereof.

8. The combination set forth in claim 6, wherein the recirculating means include a launder for receiving the discharge of oversize sands from the classifier; wherein the radiation source and detector are disposed at respectively opposite sides of the launder; and wherein there are additionally provided means within the launder locally narrowing the flow channel thereof immediately downstream from the radiation source and detector.

9. The combination set forth in claim 8, wherein the narrowing means comprise downstream-convergent baffles serving as an incomplete dam.

10. The combination set forth in claim 6, wherein the circuit also includes means for feeding water to the classifier; and means for controlling such water-feeding means, the latter means being arranged for actuation by the servomechanism.

11. In a system for automatically exercising control over a process in accordance with fluctuations in height of a body of flowable material, a source of penetrating radiation disposed at one lateral side of said body to direct radiation transversely therethrough; an elongate radiation detector at an opposite lateral side of the body; means for modulating and amplifying signals put out by said detector in response to radiation intercepted thereby; and servomechanism controlled by the output of the modulating and amplifying means and, in turn, controlling at least one phase of said process, said detector being inclined at an acute angle to the horizontal at a position relative to the radiation source such that the effective length of the detector substantially subtends a beam of radiation which traverses the total depth of the zone of height fluctuation of said body of material somewhere along its width, whereby the electrical signals put out by the detector are substantially linear with respect to fluctuations in height of the body of material.

12. In the system of claim 11, the improvement set forth by said claim wherein the radiation source has a principal radiation-directing guide, and said source is disposed with its said guide at an acute signal to the horizontal.

13. A method of controlling an industrial process operating on flowable material, the control being exercised on the basis of variations in depth of said material within a structure related to said process, comprising positioning a source of penetrating radiation at one lateral side of said structure so as to direct radiation transversely through said material so that somewhere along the width thereof the total depth of the zone of height fluctuation is traversed by radiation which serves as a sensing beam; positioning an elongate radiation detector at an opposite lateral side of said structure with its longitudinal axis inclined at an acute angle relative to the horizontal, so that its effective length substantially subtends said sensing beam; and using the varying electrical signals put out by the detector in response to sensing beam radiation for determining the control of at least one phase of said process.

14. The method set forth in claim 13, wherein the radiation source has a principal radiation-directing guide, and is positioned with said guide set at an acute angle to the horizontal.

References Cited by the Examiner

UNITED STATES PATENTS

| 1,413,934 | 4/1922 | Ramsey | 241—34 |
| 2,462,088 | 2/1949 | Friedman | 250—83.4 |
| 2,954,811 | 10/1960 | Hensgen et al. | 146—95 |
| 3,094,289 | 6/1963 | Fahlstrom | 241—34 |

FOREIGN PATENTS 68,452   11/1957   France.

ROBERT C. RIORDON, *Primary Examiner.*

MEYER PERLIN, J. SPENCER OVERHOLSER,
*Examiners.*